US007611593B2

(12) United States Patent
Silvestrin et al.

(10) Patent No.: US 7,611,593 B2
(45) Date of Patent: Nov. 3, 2009

(54) METHOD FOR PREPARING TILES OR SHEETS CONSISTING OF MOSAIC PIECES AND TILES OBTAINED THEREWITH

(75) Inventors: Claudio Silvestrin, London (GB); Stefano Bonini, Sassuolo (IT)

(73) Assignee: Brix S.r.l., Sassuolo (Modena) (IT)

( * ) Notice: Subject to any disclaimer, the term of this patent is extended or adjusted under 35 U.S.C. 154(b) by 34 days.

(21) Appl. No.: 11/902,024

(22) Filed: Sep. 18, 2007

(65) Prior Publication Data

US 2008/0075907 A1 Mar. 27, 2008

(30) Foreign Application Priority Data

Sep. 22, 2006 (EP) .................................. 06425652

(51) Int. Cl.
*B32B 37/00* (2006.01)

(52) U.S. Cl. ........................................ 156/63; 156/299

(58) Field of Classification Search .................. 156/63, 156/299, 73.6
See application file for complete search history.

(56) References Cited

U.S. PATENT DOCUMENTS 1,496,182 A * 6/1924 Stark .......................... 156/299
2,680,319 A 6/1954 Dratler
3,012,901 A 12/1961 Reese
3,150,022 A * 9/1964 Vida ........................... 156/63
3,490,096 A * 1/1970 Johnson ...................... 425/501
5,398,458 A * 3/1995 Henriksen et al. ......... 125/13.01

FOREIGN PATENT DOCUMENTS

DE 14 10 233 3/1976
EP 1 179 439 2/2002
FR 2 097 529 3/1972
JP 2005-336732 A * 12/2005

* cited by examiner

*Primary Examiner*—Jeff H Aftergut
(74) *Attorney, Agent, or Firm*—Dickstein Shapiro LLP

(57) ABSTRACT

A method for preparing tiles or sheets consisting of mosaic pieces. More particularly, the invention relates to a method allowing the assembly of mosaic pieces to be greatly facilitated within suitable supports for producing tiles or sheets of mosaic pieces that are ready to be laid down. The method provides a step of providing cube-shaped pieces and laying the latter on trays that are subjected to a vibratory and rotational motion.

5 Claims, 2 Drawing Sheets

METHOD FOR PREPARING TILES OR SHEETS CONSISTING OF MOSAIC PIECES AND TILES OBTAINED THEREWITH

FIELD OF THE INVENTION

The present invention relates to a method for preparing tiles or sheets consisting of mosaic pieces and tiles and sheets obtained therewith. Particularly, the invention relates to a method allowing the assembly of mosaic pieces to be greatly facilitated within suitable supports for producing tiles or sheets that are ready to be laid down.

BACKGROUND OF THE INVENTION

In the manufacturing field of mosaic-based floors, walls and general coverings, the modes for assembling the pieces composing a mosaic are known to be quite difficult procedures. In fact, the small size of the pieces results in the individual pieces being difficult to manipulate and handle, and the precision required to make an even tile on the one hand and on the other hand a particular pattern or geometry as desired is also difficult to be maintained. The use of an automated method is thus necessary for ensuring the quality and productivity as required.

This method consists in different working steps, in which, by means of a suitable equipment, mosaic pieces are allowed to drop on a movable plane provided with orientation means in order to determinate the proper orientation of the pieces. Subsequently, the properly oriented pieces are aligned and laid on suitable trays to be coated and fixed onto a suitable support such as to be allowed to move before being laid down. During this step of forming a mosaic covering, the pieces form a structure which is conventionally called the "tile" or "sheet".

Particularly, the above-mentioned orientation means perform a crucial step in the whole manufacturing method, as they must ensure that the pieces are perfectly oriented in order to be properly placed on their respective trays.

Mosaic pieces, in fact, are known to have irregular parallelepiped shapes, with variously sized faces. Consequently, when they are dropped on the movable plane, they can arrange themselves in an irregular manner, some laying on a larger face, while others on a smaller face. At this stage, said orientation means are required to operate in order to arrange the pieces in an even manner.

In order to carry out said operations, the orientation means usually comprise sensors that are capable of detecting the position of the pieces and overturning means for said pieces to be overturned when the pieces are in an incorrect position.

The sensors are generally optical sensor, such as photocells or the like, while the overturning means can be embodied by a blower.

In addition, guide means are provided for channeling the pieces in a row along a pathway which ends proximate to the trays, in order to fill the latter one piece at a time.

The assembly method further comprises conventional steps for applying a suitable backing to the exposed surface of the pieces that are accommodated in the trays, such as paper sheets, films or glued glass fiber, by means of conventional equipment. At this stage, the tile or sheet made of mosaic pieces can be stocked or immediately laid down according to common laying techniques.

The method described above, though being substantially reliable, is not without drawbacks which impose limitations to the production output and to the mosaic types that can be created.

It should be noted, in fact, that the method is rather complicated mainly due to the optical control for proper orientation of the pieces and the overturning mechanism for those pieces that are incorrectly positioned.

This manufacturing complexity results in, in turn, a limitation in the industrial manufacturing time, as well as costs associated therewith.

It should also be noted that the position detecting and piece overturning systems must be however subjected to accurate and standard maintenance in order to ensure optimum effectiveness and thus allowing the product quality to be kept at a high level. Obviously, this considerably affects the manufacturing costs.

Furthermore, it has been observed that the pieces that are normally used for producing mosaics have a size that can range between cm 1×1, cm 1.5×1.5; cm 2×2; cm 2.5×2.5 and the like, but cannot be less than one centimetre. This limitation is due to the fact that the electronic sensors would not be able to read a size less than one centimetre. The impossibility of reading this size means that the pieces are likely to be laid on the respective trays in an incorrect manner, as described above.

SUMMARY OF THE INVENTION

The technical problem at the heart of the present invention is thus to devise a method allowing mosaic tiles or sheets to be industrially manufactured in an easier and more productive manner, while maintaining a high quality of the final product in terms of homogeneity of the pieces composing the tiles.

Furthermore, the inventive method also allows solving the problem of the size limitations for those pieces that can be employed for producing mosaic tiles.

This problem is solved by a method for preparing tiles consisting of mosaic pieces such as to allow that the pieces are rapidly and accurately positioned while avoiding the complication of dealing with such control and orientation systems as those described above.

Accordingly, a first object of the present invention is to develop a method for preparing tiles consisting of mosaic pieces.

A second object is to provide a composite tile that can be obtained in accordance with said method.

BRIEF DESCRIPTION OF THE DRAWINGS

Further characteristics and the advantages of the present invention will be better understood from the description below of an embodiment thereof, which is given as a non-limiting example with reference to the figures in which.

DETAILED DESCRIPTION OF THE INVENTION

The concept at the heart of the invention originates from the observation that the conventional parallelepiped shape of the pieces having variously sized faces could be replaced with a piece having a shape with identical faces.

The shape that meets this requirement is a cube, whereby what face of a piece is laid on a tray is irrelevant.

Consequently, the method for preparing tiles consisting of mosaic pieces in accordance with the present invention comprises the following steps:

a) providing substantially cube-shaped mosaic pieces;

b) laying said pieces on suitable trays that are provided with grid and subjected to vibratory and rotational motion in order to allow the pieces to be evenly distributed within the seats provided by said grid.

Figure 2:
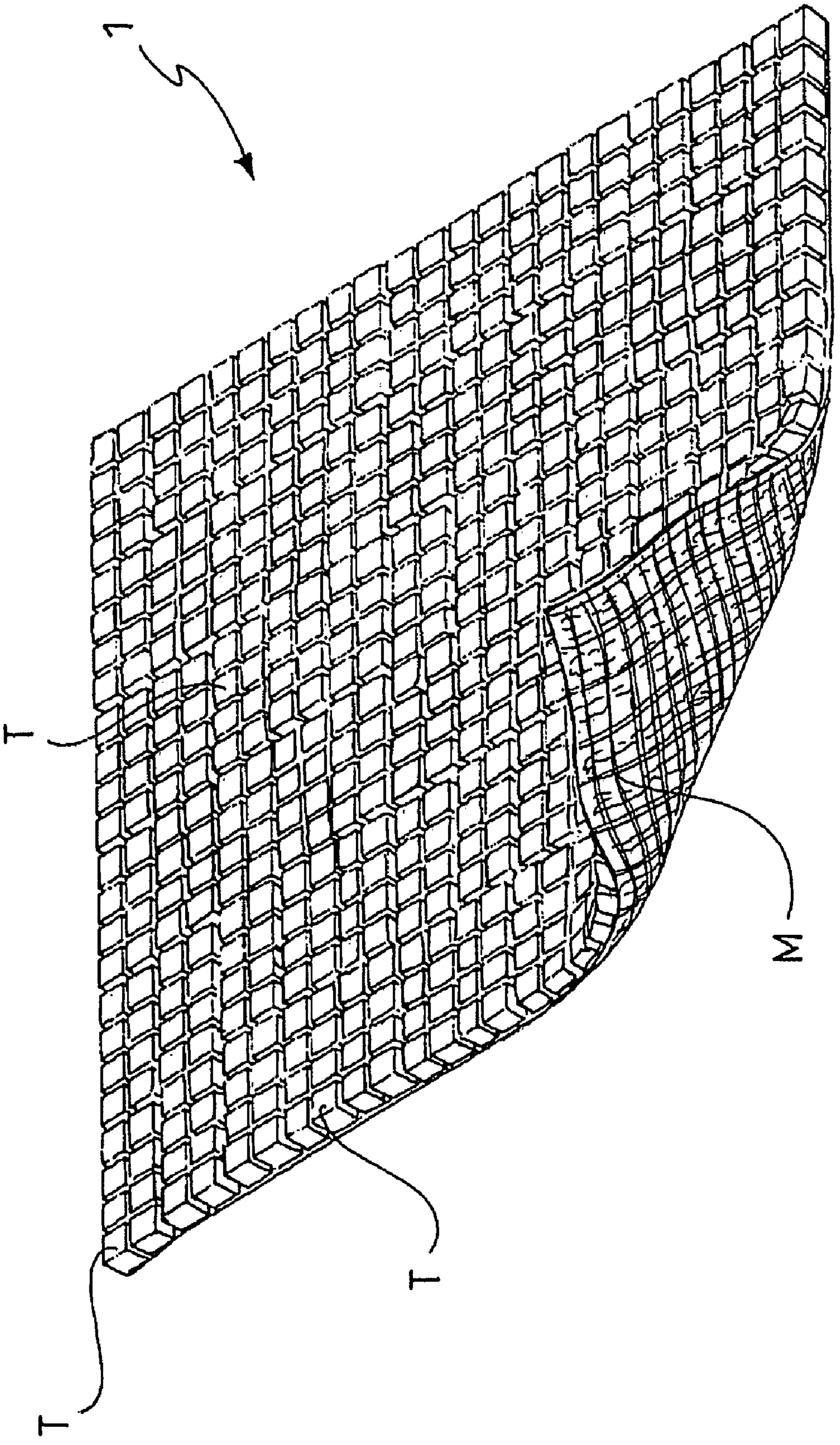
FIG. 2 illustrates a perspective view of a tile or sheet prepared according to the method of the invention.

Particularly, as better illustrated in FIG. 2, the substantially cube-shaped mosaic pieces T are mosaic pieces that can be variously sized according to the requirements dictated for example by the type of drawing to be illustrated by the mosaic. Preferably, the pieces have a size less than 1 cm, more preferably about 5 mm.

Furthermore, the pieces can be made from any of the materials that are normally used in the manufacture of mosaic pieces such as, for example, marble, enamel, ceramic, double-fired or single-fired materials, porcelain, glazed porcelain, stoneware, earthenware, stones, granites, glass.

The pieces can be produced according to any of the techniques known in the field, such as to be cube-sized as desired.

Preferably, the pieces are formed using colored atomized slurries that are made up of low-humidity porcelain stoneware (about 2%) and controlled grain size obtained in accordance with entirely conventional techniques. Thereafter, moulding is carried out by means of dry pressing, using hydraulic presses and retractable punch moulds, which are conventional in the technique of forming stoneware pieces. The result obtained is a "green" piece, i.e. a raw piece.

At this stage, a drying and backing method is carried out by means of a single-layer roller kiln with gas burners in which the pieces are subjected to more backing cycles usually lasting 80 min at about 1200° C. This treatment results in the total "vitrification" of the product by providing the product with a water-absorption rate proximate to zero and with the substantial maintenance of the cubic shape.

Figure 1:
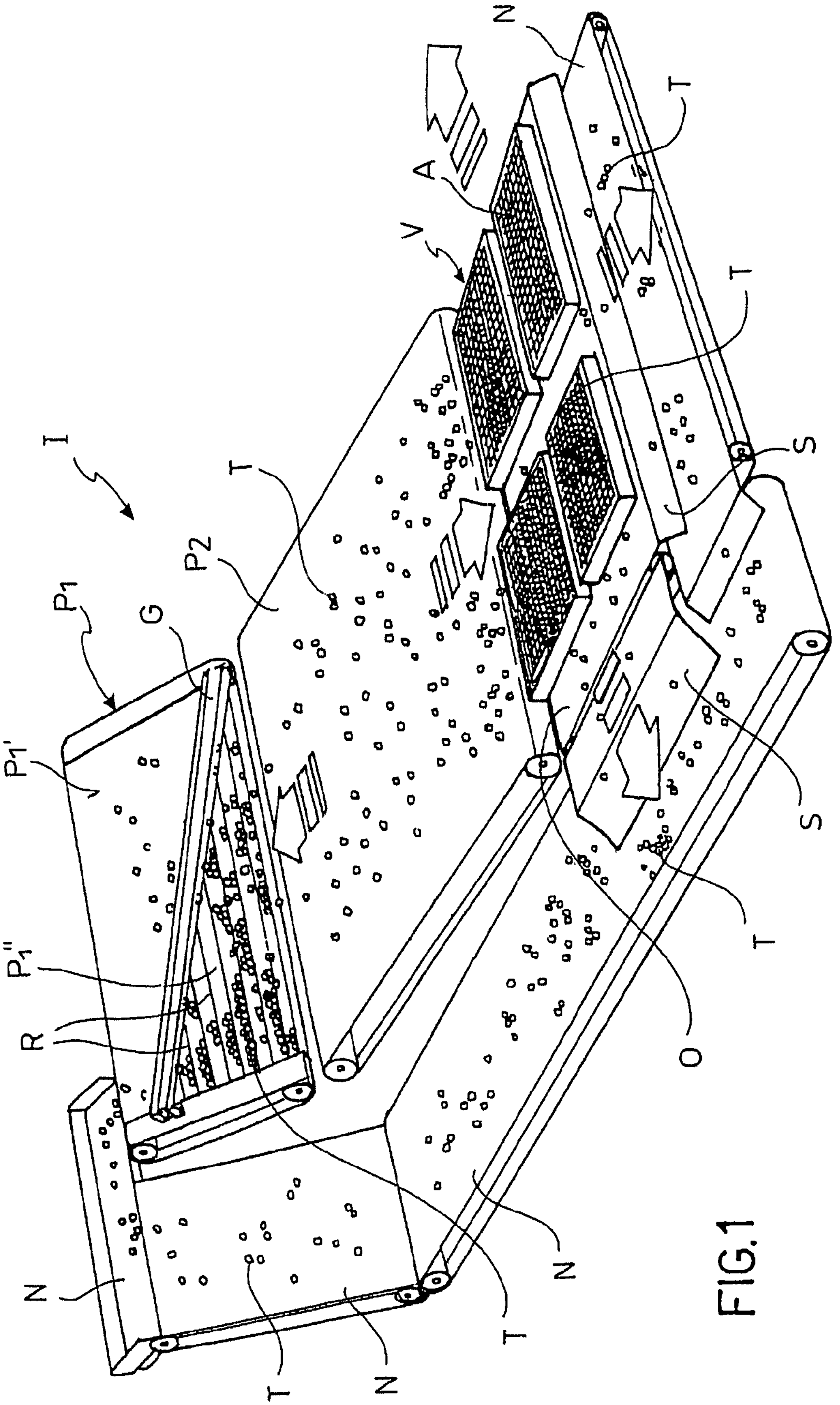
FIG. 1 illustrates a schematic view of the steps of the method for preparing the tiles or sheets according to the invention.

As schematically shown in FIG. 1, the method can further comprise a step of supplying the pieces by dropping them from the top of a first inclined plane $P_1$ until they reach a second inclined plane $P_2$, after the step a) of providing the pieces.

Particularly, the drop-supply step can be carried out along an inclined plane $P_1$ provided with a smooth upper portion $P_1'$ and a lower portion $P_1''$ provided with horizontal relieves R. The upper and lower portions are separated by a guide G that is preferably embodied by two parallel rods arranged sideways relative to the plane $P_1$.

The step of laying b) the pieces T on the trays V preferably comprises an alignment/filling step in which said pieces are first aligned in rows and then dropped on said trays by means of a vibratory reciprocating movement forward in the falling direction on the trays and backward in the opposite direction, such as shown by the arrows in FIG. 1), and an ordering step in which the pieces laid on the trays are evenly distributed by means of said vibratory and rotary forward and backward motion on the plane provided by the trays.

Particularly, the reciprocating vibratory movement allows the pieces to advance along said second inclined plane $P_2$ and be arranged in longitudinal rows before falling on the trays placed on a horizontal plane O.

The trays V are conventionally provided with a grid A that is ordered in rows and columns wherein each space provided by the grid is such as to substantially snugly accommodate one piece. In the instant case, the grid reproduces a chessboard arrangement.

While the pieces are laid as stated above, the trays are subjected to vibratory and rotational motion. Particularly, the trays are preferably secured to a horizontal plane O and the plane is subjected to vibratory and rotational agitation such as to allow each piece to be properly positioned within a seat provided by the grid A of each tray V.

During this step, it may happen that a number of pieces cannot be properly positioned on a tray but are rather pushed off the trays because of the impacts against the grid walls caused by the random agitation to which the trays are subjected.

As a consequence, advantageously, the method can comprise a step in which said pieces are recovered and brought back to the level of drop-supply step described above. This step can be carried out by means of one or more chutes S that are placed along the edges of the horizontal plane O such as to cause the pieces to slide along a closed-loop circuit of conveyor belts N.

In addition, after the trays have been filled with the pieces, a step of manual or automatic control can be provided, according to conventional methods, for the pieces to be properly placed on the trays in order to ensure greater accuracy throughout the process.

From what has been stated above, it is understood that the major advantage of the present invention is that it allows avoiding the orientation step of the pieces. In fact, as the pieces are cube-shaped, the way in which they are laid on the conveying planes and trays is entirely irrelevant. Accordingly, both the detection operated by the sensors for all the moving pieces and the overturning that may be operated by the blower on the overturned pieces can be advantageously avoided.

There results that the manufacturing method is considerably simplified. Furthermore, it is understood that with this simplification, the entire production can be accelerated thus increasing the industrial productivity of the tiles consisting of mosaic pieces.

The above-mentioned maintenance of the detection and overturning devices is thus also advantageously avoided. Consequently, the preparing method is particularly cost-effective.

In addition, it is understood that the system for producing said tiles can be considerably simplified by eliminating the sensors and overturning means.

It is also important to note that, by the inventive method, mosaics can be produced with pieces having such a size as to allow providing new particular effects, thereby increasing the aesthetic value of the same.

The method for preparing a tile with mosaic pieces of the invention can then comprise a step of applying a backing on the exposed surface of the pieces laying on the trays such as to form an individual structure (either a tile or a sheet) that can be stocked, transported, manipulated and finally laid down.

The step of applying said backing can be carried out by any of the techniques known in the field, such as the application of a nylon, glass fiber, plastic or paper web by means of gluing.

The step of applying the backing can be carried out by laying on each tray a web made of, for example, glass fiber impregnated with glue and subsequently passing a press roller thereon for ensuring proper adhesion and gluing of the web on the pieces.

Finally, the trays containing the pieces coated with said web made of web fiber and glue are conveyed to a conventional kiln for curing the glue.

After the curing step has been completed, the trays can be overturned and the thus-formed tiles can be stocked ready to be laid down.

As may be noted in FIG. 2, the tile or sheet designated with numeral 1 consists of substantially cube-shaped pieces T, preferably having a size ranging between 10 and 2 mm, more preferably between 7 and 4 mm, most preferably about 5 mm, which are regularly arranged and connected to each other by means of the glass fiber web M that is bonded on one of the two faces of the tile.

The size of both the individual pieces T and the tiles 1 can be changed according to the requirements or particular preferences. When, for example, a more accurate aesthetic effect is desired, then the size of the pieces can be reduced in the order of 5 mm. The size of the tiles 1 can be also changed simply using trays or in-line manufacturing systems that are suitable for different requirements or preferences. For example, a manufacturing system can be arranged in which the pieces are assembled in the tiles in a substantially continuous manner such as a sort of mosaic carpet is manufactured.

The manufacturing system I can be very simplified, as it can consist of, such as schematically shown in FIG. 1, a feeding device $P_1$, an alignment/filling device $P_2$ of the trays V with pieces T, an ordering device O for the pieces on the trays and a recovery device N for the pieces T that have fallen off the trays.

The feeding device $P_1$ can be embodied by a first inclined plane, while the alignment/filling device $P_2$ can be embodied by a second inclined plane as described above.

The ordering device O for the tiles T on the trays V can be embodied by a horizontal plane on which the trays V are reversibly secured, which must be filled with the pieces T. Said ordering device O can further comprise a chute S for unloading the pieces T that have fallen off the trays V and recovering them by means of the recovery device N.

Preferably, all of these devices consist of conveyor belts that are moved in accordance with widely known techniques.

The recovery device N for the pieces can be also embodied by a system of conveyor belts collecting those pieces that have been unloaded from the chute S and bringing them back to the level of the feeding device $P_1$ of the system I.

It is understood that this system can be further modified, such as by providing a loading device $P_1$ consisting of a hopper (not shown) that can be manually or automatically loaded, which is positioned either above the alignment/filling device $P_2$ or directly on the ordering device O such as to directly feed the respective trays V.

Furthermore, the system can be one of the conventional systems used for preparing mosaic tiles, in which the orientation and overturning devices are simply not operated.

It should be noted that those of ordinary skill in the art will be capable of carrying out further modifications to the method and system described above, while still remaining within the scope of protection of the present invention as defined in the claims below.

What is claimed is:

1. A method for preparing tiles (1) consisting of mosaic pieces (T) comprising the following steps:

a) providing substantially cube-shaped mosaic pieces (T);

b) laying said pieces on suitable trays (V), that are provided with grid (A), and subjected to vibratory and rotational motion, including an alignment/filling step in which said pieces are first aligned in rows and then dropped on said trays by means of a vibratory reciprocating movement forward in the falling direction on the trays and backward in the opposite direction, and an ordering step in which the pieces laid on the trays are evenly distributed within the grid of said trays by means of said vibratory and rotary motion.

2. The method according to claim 1, further comprising a step of drop-supplying the pieces (T) onto an inclined plane ($P_1$) after step a).

3. The method according to claim 2, further comprising a step of recovering the pieces (T) which inadvertently fall off the trays and bringing them back to the feeding step.

4. The method according to claim 1, further comprising a step of controlling the proper positioning of the pieces (T) on the trays (V).

5. The method according to claim 1, further comprising a step of applying a backing on the exposed surface of the pieces (T) that are laid on said trays (V) such as to form a tile.

* * * * *